(12) United States Patent
Yang

(10) Patent No.: US 11,798,174 B2
(45) Date of Patent: Oct. 24, 2023

(54) METHOD, DEVICE, EQUIPMENT AND STORAGE MEDIUM FOR LOCATING TRACKED TARGETS

(71) Applicant: PING AN TECHNOLOGY (SHENZHEN) CO., LTD., Guangdong (CN)

(72) Inventor: Guoqing Yang, Guangdong (CN)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 412 days.

(21) Appl. No.: 17/266,187

(22) PCT Filed: Dec. 24, 2018

(86) PCT No.: PCT/CN2018/123080
§ 371 (c)(1),
(2) Date: Feb. 5, 2021

(87) PCT Pub. No.: WO2020/098076
PCT Pub. Date: May 22, 2020

(65) Prior Publication Data
US 2021/0295536 A1 Sep. 23, 2021

(30) Foreign Application Priority Data
Nov. 12, 2018 (CN) .......................... 201811339121.3

(51) Int. Cl.
G06T 7/246 (2017.01)
G06T 7/70 (2017.01)
G06N 3/08 (2023.01)

(52) U.S. Cl.
CPC ............... *G06T 7/248* (2017.01); *G06N 3/08* (2013.01); *G06T 7/70* (2017.01);
(Continued)

(58) Field of Classification Search
None
See application file for complete search history.

(56) References Cited

U.S. PATENT DOCUMENTS 10,679,428 B1 * 6/2020 Chen .................... G06F 18/2413
2019/0130189 A1 * 5/2019 Zhou .................... G06V 10/7515
2019/0325605 A1 * 10/2019 Ye ........................ G06F 18/2431

FOREIGN PATENT DOCUMENTS

CN 106803263 A 6/2017

\* cited by examiner

*Primary Examiner* — Leon Viet Q Nguyen

(57) ABSTRACT

A method for tracking a target includes: acquiring original position information of an original target point selected by a user contained in a locating request if the locating request for tracking a target is received; carrying out target prediction on a current frame image according to a preset target prediction model to obtain a target prediction result; calculating an Euclidean distance between each of the targets to be tracked and the original target point according to the target position information and original coordinates of each of the target regions to obtain N distances; selecting a distance with the smallest numerical value from the N distances as a target distance, acquiring target position information corresponding to the target distance, and determining a target to be tracked in a target region corresponding to the obtained target position information as a tracked target corresponding to an original target point.

12 Claims, 8 Drawing Sheets

(52) U.S. Cl.
CPC ............... *G06T 2207/10016* (2013.01); *G06T 2207/20081* (2013.01); *G06T 2207/20084* (2013.01); *G06T 2207/20101* (2013.01)

Aiming at each target position information, calculating center point coordinates $(x_{i_0}, y_{i_0})$ of a target region corresponding to the $i^{th}$ target position information according to the following center point coordinate formula:

$$(x_{i_0}, y_{i_0}) = \left( x_i + \frac{w_i}{2}, y_i + \frac{h_i}{2} \right)$$

, wherein i is a positive integer, and $0 < i \leq N$, $x_i$ is an abscissa of upper left coordinates of the target region corresponding to the $i^{th}$ target position information, $y_i$ is an ordinate of the upper left coordinates, $w_i$ is a width of the target region corresponding to the $i^{th}$ target position information, and $h_i$ is a height of the target region corresponding to the $i^{th}$ target position information

—S301

Calculating an Euclidean distance $d_i$: $d_i = \sqrt{(\Delta x - x_{i_0})^2 + (\Delta y - y_{i_0})^2}$ between the $i^{th}$ center point coordinates $(x_{i_0}, y_{i_0})$ and the original coordinates $(\Delta x, \Delta y)$ for each of the center point coordinates

METHOD, DEVICE, EQUIPMENT AND STORAGE MEDIUM FOR LOCATING TRACKED TARGETS

CLAIM OF PRIORITY

The present application is based on and claims the priority of a Chinese invention patent application No. 201811339121.3 filed on Nov. 12, 2018 with the application number and entitled "Method, Device, Equipment and Storage medium for Locating Tracked Targets".

TECHNICAL FIELD

The invention relates to the technical field of image processing, in particular to a method, a device, equipment and a storage medium for locating tracked targets.

BACKGROUND

Locating tracked targets in a long distance has always been one of the most challenging tasks in video monitoring. According to a traditional method for locating the tracked targets, information about coordinates of a target to be tracked in an image is written into a file, and initialized target information is acquired by reading the file when tracking is started, the operation period of the method is long, and the efficiency of acquiring the initialized target information is not high; according to another method, a video picture is paused, a position of a target to be tracked is drawn in the image manually, and after tracking is started, the target tracking initialization is carried out according to the manually drawn position information. As the manually drawn position information is not so accurate, a large amount of background information is easily contained, and the tracked targets are intercepted or blocked by the background, the difficulty in tracking the targets is increased, and the efficiency of acquiring the initialized positioning information of the tracked targets is not high.

SUMMARY

Therefore, it is necessary to provide a method, a device, equipment and a storage medium for locating tracked targets in order to solve the problem that both the locating efficiency and accuracy of the tracked target are not high.

A method for locating tracked targets comprises the following steps:

acquiring original position information of an original target point selected by a user contained in a locating request if the locating request of a tracked target is received, wherein the original position information comprises a current frame image of the original target point in currently played video data and original coordinates of the original target point in the current frame image;

carrying out target prediction on the current frame image according to a preset target prediction model to obtain a target prediction result, wherein the target prediction model is a convolution neural network model comprising two convolution layers and two fully connected layers, the target prediction result comprises N target regions and target position information corresponding to each of target regions, N is a positive integer, and each of the target regions comprises a target to be tracked;

calculating Euclidean distances between each of the targets to be tracked and the original target point according to the target position information and the original coordinates of each of the target regions to obtain N distances; and selecting a distance with the smallest numerical value from the N distances as a target distance, acquiring target position information corresponding to the target distance, and determining a target to be tracked in a target region corresponding to the acquired target position information as a tracked target corresponding to the original target point.

A device for locating tracked targets comprises:

a request receiving module used for acquiring original position information of an original target point selected by a user contained in a locating request if the locating request of a tracked target is received, wherein the original position information comprises a current frame image of the original target point in currently played video data and original coordinates of the original target point in the current frame image;

a target prediction module used for carrying out target prediction on the current frame image according to a preset target prediction model to obtain a target prediction result, wherein the target prediction model is a convolution neural network model comprising two convolution layers and two fully connected layers, the target prediction result comprises N target regions and target position information corresponding to each of target regions, N is a positive integer, and each of the target regions comprises a target to be tracked;

a distance calculation module used for calculating Euclidean distances between each of the targets to be tracked and the original target point according to the target position information and the original coordinates of each of the target regions to obtain N distances; and a target confirmation module used for selecting a distance with the smallest numerical value from the N distances as a target distance, acquiring target position information corresponding to the target distance, and determining a target to be tracked in a target region corresponding to the acquired target position information as a tracked target corresponding to the original target point.

A computer device comprising a memory, a processor, and computer readable instructions stored in the memory and executable on the processor to perform a method for locating tracked targets as described above when the processor executes the computer readable instructions.

One or more non-volatile readable storage media having computer-readable instructions stored thereon that, when executed by one or more processors, cause the one or more processors to carry out a method for locating tracked targets as described above.

The details of one or more embodiments of the disclosure are set forth in the accompanying drawings and the description below, and other features and advantages of the disclosure will be apparent from the description, the drawings, and the claims.

BRIEF DESCRIPTION OF THE ACCOMPANYING DRAWINGS

In order to illustrate the technical solutions of the embodiments of the present application more clearly, the drawings used in the description of the embodiments of the present application will be briefly described, and it is obvious that the drawings in the following description are only some embodiments of the present application, and that other drawings can be obtained according to these drawings without involving any inventive effort for a person skilled in the art.

FIG. 3 is a flow chart illustrating an implementation of step S3 in a method for locating tracked targets according to one embodiment of the present application;

DETAILED DESCRIPTION OF ILLUSTRATED EMBODIMENTS

Reference will now be made in detail to the embodiments of the present application, examples of which are illustrated in the accompanying drawings. Based on the embodiments in the present application, all other embodiments obtained by a person skilled in the art without involving any inventive effort are within the scope of protection of the present application.

Figure 1:
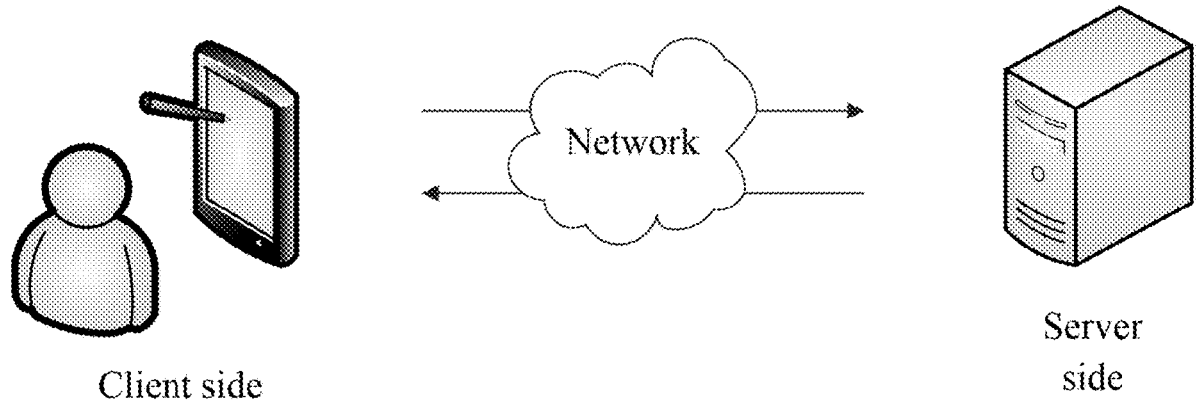
FIG. 1 is a schematic diagram of an application environment of a method for locating the tracked targets in one embodiment of the present application.

FIG. 1 shows an application environment provided by an embodiment of the application, wherein the application environment comprises a server side and a client side connected via a network, the client side is used for detecting a touch operation of a user, generating a locating request according to the touch operation, and sending the locating request to the server side; the server side is used for processing video data, and the server side can be specifically realized by an independent server or a server cluster formed by a plurality of servers. The method for locating the tracked targets provided by an embodiment of the application is applied to the server side.

Figure 2:
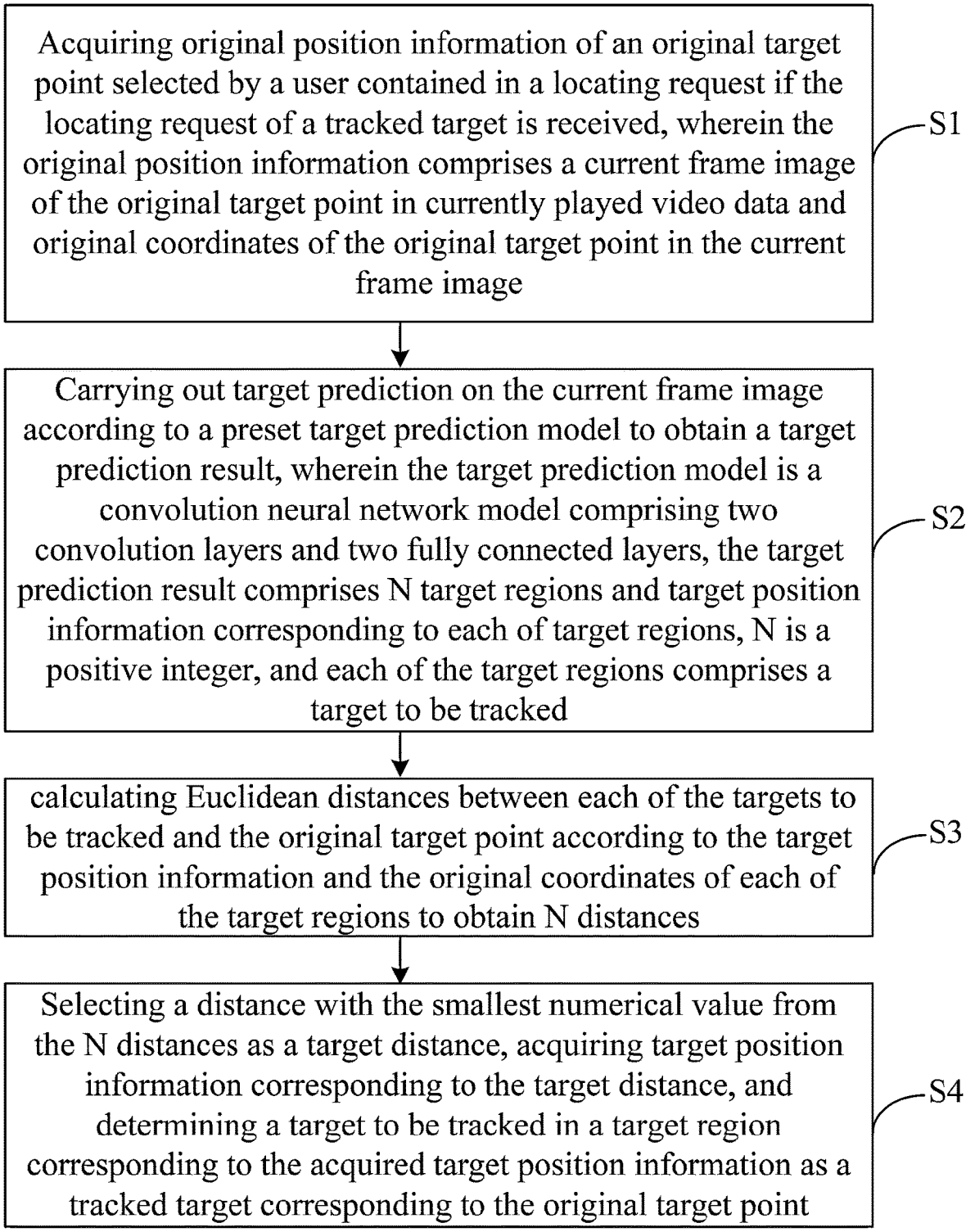
FIG. 2 is a flow chart of a method for locating the tracked targets in one embodiment of the present application.

Referring to FIG. 2, an implementation flow of a method for locating the tracked targets provided by the embodiment is shown. Details are as follows:

S1: original position information of an original target point selected by a user contained in a locating request is acquired if the locating request of a tracked target is received, wherein the original position information comprises a current frame image of the original target point in currently played video data and original coordinates of the original target point in the current frame image.

In the embodiment, an original target point is a point on a location area where a user selects a target to be tracked in a video picture being played. The client side generates a locating request for tracking the target by detecting touch operation, click operation or other operation of the user, and sends the locating request to the server side for processing.

The touch operation refers to an operation carried out on a display device by touching a screen by a human hand, and the display device can position selection information input according to a cursor or menu position touched by the human hand, or detect coordinates of the touched position according to the position touched by the human hand. The click operation refers to an operation realized by clicking a cursor on a display device, wherein the display device can locate selection information input according to the cursor or menu position clicked according to the cursor or detect the coordinates of the cursor click according to the position clicked according to the cursor.

It should be noted that the display device for acquiring the original position information of the original target point in the video data may be specifically a touch screen or other device, and is not specifically limited thereto. The current frame image refers to a currently played picture where an original target point is located, and can be locked by a component in a display device.

Preferably, in the embodiment, a display device of a touch screen is used for acquiring original position information of an original target point in video data, wherein the touch screen is composed of a touch detection component and a touch screen controller, i.e., the touch detection component and the touch screen controller are installed in the display device, the touch detection component is used for detecting the position touched by a user and locking the current frame image of the video data currently being played, generating touch information, and sending the touch information to the touch screen controller. The touch screen controller is mainly used to receive the touch information from the touch point detection device and convert the position touched by a user in the touch information into contact coordinates, wherein the contact coordinates are the original coordinates of the original target point.

In particular, according to a video played in real time, since a user wants to select a certain target in a video picture, a touch operation can be performed on a display device playing the video. When a client side detects a touch operation of the user on the display device, a current frame image of video data currently being played and original coordinates of the original target point selected by the user in the current frame image can be determined according to the touch operation, and generating a locating request containing the current frame image and the original coordinates, and the client side sends the locating request to the server side.

The server side receives the locating request and reads the original position information of the original target point carried in the locating request.

S2: target prediction is carried out on the current frame image according to a preset target prediction model to obtain a target prediction result, wherein the target prediction model is a convolution neural network model comprising two convolution layers and two fully connected layers, the target prediction result comprises N target regions and target position information corresponding to each of target regions, N is a positive integer, and each of the target regions comprises a target to be tracked.

In the embodiment, the preset target prediction model is obtained by training according to actual service requirements and is used for predicting candidate target regions in the current frame image where the original target point is located, wherein the candidate target regions are regions containing movable objects in the current frame image, each of the movable objects corresponds to one target region, and the target regions are displayed in the form of rectangular frames. The movable object in the target region is a target to be tracked, and the target position information of the target region comprises upper left coordinates of the region, a width and a height of the region. A convolution layer of the target prediction model is used for carrying out image feature extraction on the current frame image, and the fully connected layer outputs a target region corresponding to the image feature and target position information corresponding to the target region according to the extracted image feature.

Specifically, inputting a current frame image into a preset target prediction model, carrying out image feature extraction on the current frame image through a convolution layer in the model, and then outputting a target region corresponding to the image feature and target position information corresponding to the target region through a fully connected layer of the model as a target prediction result.

For example, inputting a frame of image into a preset target prediction model, carrying out image feature extraction on the frame of image through a convolution layer in the model, then displaying a movable object which does not belong to an image background in the form of a rectangular frame through a fully connected layer of the model through the extracted image feature, and assuming that six movable objects are predicted, the target prediction result relates to six target regions, and target position information corresponding to the six target regions.

Note that the target prediction is carried out on the current frame image through the trained target prediction model, the image feature extraction is carried out on the current frame image through the convolution layer in the target prediction model, the movable object and the context in the current frame image can be accurately distinguished, the situation that the position information of the manually drawn prediction target is inaccurate and the prediction target is easily blocked by the context is avoided, and the accuracy of tracked target prediction is improved.

S3: Euclidean distances between each of the targets to be tracked and the original target point is calculated according to the target position information and the original coordinates of each of the target regions to obtain N distances.

In the embodiment, since the Euclidean distance is a common distance definition that can be used to represent the true distance between a plurality of points in m-dimensional space, or a natural length of a vector, and the Euclidean distance between two points in the two-dimensional space is an actual distance between the two points. Therefore, the position relation between each of the targets to be tracked and the original target point can be reflected quickly and intuitively by calculating the Euclidean distance between each of the targets to be tracked and the original target point.

Specifically, the target position information of each of the target regions obtained in step S2 and the original coordinates of the original target points obtained in step S1 are substituted into an Euclidean distance formula, and N Euclidean distances between each of targets to be tracked and the original target points in the target region can be obtained through calculation.

For example, continuing with an example in step S2, if the six target regions and the target position information corresponding to the six target regions are predicted by the target prediction model, the target position information and the original coordinates of the six target regions are substituted into the Euclidean distance formula, and the Euclidean distances between the six targets to be tracked and the original target points can be calculated to obtain the six distances.

S4: a distance with the smallest numerical value from the N distances is selected as a target distance, target position information corresponding to the target distance is acquired, and a target to be tracked in a target region corresponding to the acquired target position information is acquired as a tracked target corresponding to the original target point.

In the embodiment, since the N Euclidean distances calculated in step S3 can intuitively reflect the positional relationship between each of targets to be tracked and the original target point, it can be understood that in general, the position of the target to be tracked is closest to the original target point, and then the target to be tracked is a tracked target corresponding to the original target point. The target distance is a distance between the original target point position and the nearest target to be tracked.

Specifically, any two distances among the N distances obtained in step S3 are compared, a distance with a small value is taken, the distance with the small value is compared with other distances, and the like until the distance with the smallest value among the N distances is compared, and the distance with the smallest value is taken as a target distance; and the target to be tracked in the target region corresponding to the distance with the smallest value is taken as a tracked target corresponding to the original target point.

For example, continuing with the example in step S3, assuming that the calculated six distances are 45.63, 56.03, 78.24, 34.33, 40.55, and 63.06, respectively, any two of the six distances are compared, and if 45.63 is compared with 56.03, 45.63 is less than 56.03, then 45.63 is selected and compared with other distances; if 45.63 is compared with 40.55, 45.63 is greater than 40.55, then 40.55 is selected, and so on, and the target to be tracked in the target region corresponding to the distance 34.33 is taken as the tracked target corresponding to the original target point until the distance with the smallest value is 34.33.

In the embodiment, original position information of an original target point selected by a user is obtained from a received locating request of a tracked target, target prediction is carried out on a current frame image of video data in the original position information according to a preset target prediction model, a target prediction result is obtained, and the target and the context in the current frame image can be accurately distinguished. The situation that the position information of the manually drawn prediction target is inaccurate and the prediction target is easy to be blocked by the context is avoided, so that the prediction accuracy of the tracked target is improved. Meanwhile, the Euclidean distance between each of the targets to be tracked and the original target point is calculated according to the target position information of each of the target regions and the original coordinates, the distance with the smallest numerical value is selected as a target distance, target position information corresponding to the target distance is acquired, and a target to be tracked in a target region corresponding to the acquired target position information is determined as a tracked target corresponding to an original target point. The method for determining the tracked target by calculating the minimum distance between the target to be tracked and the original target point on the basis of ensuring that the predicted target region in the current frame image is more accurate can ensure the positioning accuracy of the tracking target. According to the method, the operation amount is small, the operation is simple and convenient, a user does not need to pause the currently played video, the operation period is shortened, and therefore the positioning efficiency of the tracking target is improved.

In one embodiment, as shown in FIG. 3, in step S3, the target position information corresponding to the target region comprises the upper left coordinates of the target region and a width and a height of the target region, i.e. the Euclidean distance between each of the targets to be tracked and an original target point is calculated according to the target position information and the original coordinates of each of the target regions to obtain N distances, which specifically comprises the following steps:

S301: aiming at each target position information, calculating center point coordinates of a target region corresponding to the $i^{th}$ target position information according to the following center point coordinates formula $(x_{i_0}, y_{i_0})$:

$$(x_{i_0}, y_{i_0}) = \left(x_i + \frac{w_i}{2}, y_i + \frac{h_i}{2}\right)$$

wherein i is a positive integer, and $0 < i \leq N$, $x_i$ is an abscissa of upper left coordinates of the target region corresponding to the $i^{th}$ target position information, $y_i$ is an ordinate of the upper left coordinates, $w_i$ is a width of the target region corresponding to the $i^{th}$ target position information, and $h_i$ is a height of the target region corresponding to the $i^{th}$ target position information.

Specifically, since the target region is displayed in the form of a rectangular frame, and the position information of the target region comprises the upper left coordinates of the rectangular frame, the width and the height of the rectangular frame. In order to accurately reflect the position relationship between the target to be tracked and the original target point in each target region, the position information of the target region needs to be substituted into a central point coordinates formula to calculate to obtain the central point coordinates of each target region. Therefore, N target regions are predicted on the current frame image, the center point coordinates of the first target region to the $N^{th}$ target region are calculated respectively according to the center point coordinates formula, N center point coordinates are obtained, and the Euclidean distance between each of the targets to be tracked and the original target point can be calculated conveniently and rapidly according to the obtained center point coordinates of the N target regions.

For example, assuming that a target region predicted on the current frame image has upper left coordinates of (50, 50), a width of 80, and a height of 60, the position information of the target region is substituted into a center coordinates formula for calculation to obtain center point coordinates of the target region (70, 80).

S302: calculating the Euclidean distance $d_i$ between the $i^{th}$ center point coordinates $(x_{i_0}, y_{i_0})$ and the original coordinates $(\Delta x, \Delta y)$ for each of the center point coordinates;

$$d_i = \sqrt{(\Delta x - x_{i_0})^2 + (\Delta y - y_{i_0})^2}$$

Specifically, each of the center point coordinates and the original coordinates obtained in step S301 are respectively substituted into an Euclidean distance formula for calculation, so that the Euclidean distance between the target to be tracked and the original target point in each of the target regions can be rapidly calculated.

For example, continuing with an example in step S301, the center point coordinates of a target region (90, 80) are obtained, assuming the origin coordinates are (110, 130), and the center point coordinates and the origin coordinates are substituted into the Euclidean distance formula for calculation to obtain an Euclidean distance $d_1$ approximately equal to 53.85. If the coordinates of the other two center points obtained through calculation are (60, 90) and (100, 70), which are respectively substituted into the Euclidean distance formula with the coordinates of the origin for calculation, wherein the Euclidean distance $d_2$ corresponding to the center point coordinates (60, 90) is equal to about 64.03, and the Euclidean distance $d_3$ corresponding to the center point coordinates (100, 70) is equal to about 60.83.

In the embodiment, the center point coordinates formula is adopted to calculate the center point coordinates of the target region for the target position information of the target region obtained in step S2, and then each of the obtained center point coordinates and the origin coordinates are respectively substituted into the Euclidean distance formula for calculation, so that the Euclidean distance between the target to be tracked and the original target point in each of the target regions can be quickly calculated.

Figure 4:
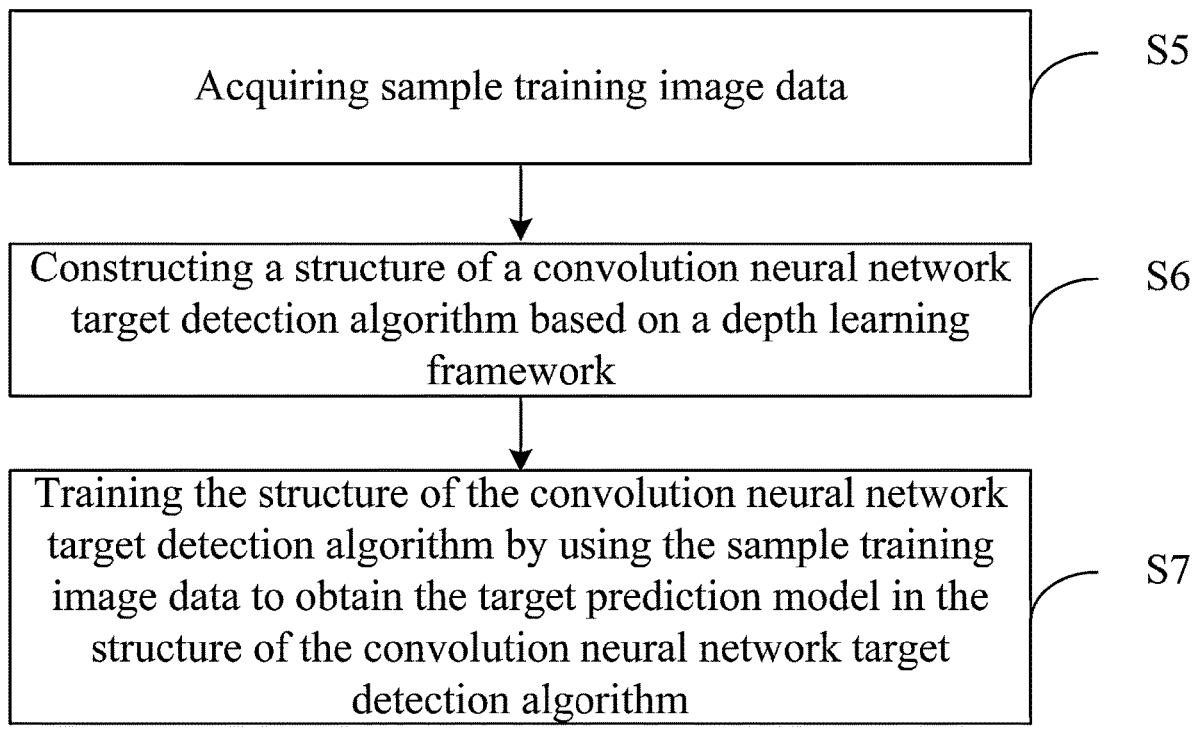
FIG. 4 is a flowchart for constructing a target prediction model in a method for locating the tracked targets in one embodiment of the present application.

In one embodiment, as shown in FIG. 4, before step S2, the method for locating the tracked targets further comprises the following steps:

S5: acquiring sample training image data.

In this embodiment, the sample training image data includes an MsCoCo data set and a CalTech data set. The MsCoCo data set is a public data set shared by networks, wherein the data set comprises 328000 images, 2500000 tags and images containing 91 types of targets, the data set takes scene understanding as a target, the targets in the images are calibrated through accurate segmentation, and the targets are intercepted from complex daily scenes. Caltech data set is a public data set shared by a network and mainly comprises two types, one is Caltech-101 including 101 types of images (each type is of about 40-800 images, most of the images are 50 images/type, with a pixel size of 300×200 for each), and the other is Caltech-256, similar to Caltech-101 including 30607 images.

Specifically, the methods for acquiring the sample training image data may include, but is not limited to, receiving sample training image data uploaded by a user, or automatically and periodically acquiring the sample training image data from a third party video image database, which may be, in particular, a database of a network video platform, and other methods for acquiring are not limited herein.

S6: A structure of a convolution neural network target detection algorithm is constructed based on a depth learning framework.

In the embodiment, the depth learning framework includes caffe or caffe2, etc., where caffe2 is a lightweight, modular, and extensible framework including a blob, a layer, and a net. The blob is a standard array structure and unified storage interface for the entire framework. Layer serves as a layer structure basis for modeling and computing, and net serves as a collection and link of layers. The details of the blob describe how information is stored and exchanged between layers and nets. Caffe2 defines the network layer by layer by using its own modeling method, that is, the network defines the whole model from bottom to top from the input data to the loss layer. Information such as data and partial derivatives flows forward and backward in the network, while caffe2 stores, exchanges and manipulates this information using blobs.

Preferably, in the embodiment, a structure for constructing a convolution neural network target detection algorithm (Fast er-RCNN) based on caffe2 framework is employed. In particular, the structure of the Fast er-RCNN can be defined by layers in the caffe2 framework. Then, each defined layer structure is linked by a structure link (net). The linked layer structure is stored through blobs in the caffe2 framework to obtain a built Faster-RCNN structure, the structure of the Faster-RCNN built in the caffe2 framework is clear in logical structure hierarchy and clear in parameter definition, parameter positions in the structure can be quickly locked according to the parameter definition, and the structure of the Faster-RCNN is convenient to modify and perfect.

In the embodiment, the structure of the constructed convolution neural network target detection algorithm is composed of two convolution layers and two fully connected layers, wherein the first layer is a first convolution layer, the second layer is a second convolution layer, the third layer is a first fully connected layer and the fourth layer is a second fully connected layer according to the sequence from front to back.

The first convolution layer can be used for convoluting input image data and carrying out preliminary feature extraction on the image data, specifically, 96 feature maps corresponding to the input image data can be extracted by setting the size of a convolution kernel window of the convolution layer to be 11*11 and the center distance of adjacent local receiving domains to be 4, and then a first convolution layer is connected with a down-sampling layer through which the dimension of each feature map can be reduced so as to compress the feature maps and ensure the integrity of the extracted features, the core window size of the down-sampling layer is usually set to be 3*3, the center distance of adjacent local receiving domains is 2, and finally, the feature maps obtained after the down-sampling layer are reduced can be input to the second layer of convolution layer.

The second convolution layer can be used for convoluting the feature maps obtained in the first convolution layer, i.e. carrying out further feature extraction on the feature maps obtained in the first convolution layer, feature extraction precision is improved, the size of a convolution kernel window of the second convolution layer is set to be 5*5, the center distance of adjacent local receiving domains is set to be 2, and 256 feature maps can be output; the second convolution layer is connected with a down-sampling layer, each feature map is subjected to dimension reduction by one down-sampling layer so as to compress the feature maps and ensure the integrity and precision of the extracted features, the size of a kernel window of the down-sampling layer is set to be 3*3, the center distance of adjacent local receiving domains is 2, and the feature maps obtained after dimension reduction through the down-sampling layers can be input to the first full-connection layer.

The third layer is a first fully connected layer, 1000 neurons are arranged in the first fully connected layer and can be used for converting a feature map obtained in the second convolution layer into an n-dimensional column vector, and the n-dimensional column vector and a weight matrix and bias of the first fully connected layer can be subjected to nonlinear conversion to obtain a 1000-dimensional column vector which is input to the second fully connected layer;

the fourth layer is a second fully connected layer, which is provided with m neurons, and the fourth layer can be used for carrying out nonlinear transformation on a 1000-dimensional column vector obtained in the first fully connected layer and a weight matrix and bias of the second fully connected layer to obtain an m-dimensional feature vector, wherein the value of m is determined according to the number of targets on an image and can be specifically determined by updating the weight matrix and bias of the second fully connected layer; that is, m targets are correspondingly provided with m neurons.

S7: the structure of the convolution neural network target detection algorithm is trained by using the sample training image data to obtain the target prediction model in the structure of the convolution neural network target detection algorithm.

In the embodiment, the structure of the convolution neural network target detection algorithm is trained by using sample training image data in a manner that shared features are alternately trained on an MsCoCo data set and a CalTech data set, that is, the same pictures in the two data sets are subjected to feature extraction and weight matrixes and biases in the structure of the convolution neural network target detection algorithm are updated until the same target number is obtained, and the weights and biases which should be used in the target prediction model can be determined to obtain a target prediction model. The target prediction model comprises two files, one is a structure of a convolution neural network target detection algorithm, and the other is a weight and a bias of each layer in the structure of the convolution neural network target detection algorithm, wherein the weight is a weight value in a weight matrix, and the bias is a bias corresponding to the weight matrix.

In particular, according to the training process, the sample training image data are subjected to feature extraction in the structure of a convolution neural network target detection algorithm, a cost function contained in each layer of the structure of the convolution neural network target detection algorithm is calculated by using a traditional random gradient descent algorithm according to a direction from front to back of the layer structure to obtain a cost function value corresponding to each layer. The cost function value can be used to calculate the error sensitivity in each subsequent layer, each layer of the structure of the convolution neural network target detection algorithm is calculated through a traditional back propagation algorithm according to the direction from back to front of the layer structure to obtain the error sensitivity in each layer, and the weight value and the bias contained in the calculated error sensitivity of each layer to update the original weight value and the bias in the layer structure to obtain the target prediction model.

In the embodiment, since the structure of the target detection algorithm has good fitting property to the sample training image data, based on caffe2 framework, the structure of convolution neural network target detection algorithm is constructed. In the structure of the constructed convolution neural network target detection algorithm, the arranged slidable convolution kernel window is used to convolving the input sample training image data to realize the feature extraction of the sample training image data, which can ensure the integrity of feature extraction of the sample training image data, and has high invariance on geometric transformations such as image deformation, translation and the like in the process of extracting the image features, so that the integrity of the features of the target of the image predicted by the trained target prediction model can be ensured, and the accuracy of subsequent target information identification in the image can be ensured.

Figure 5:
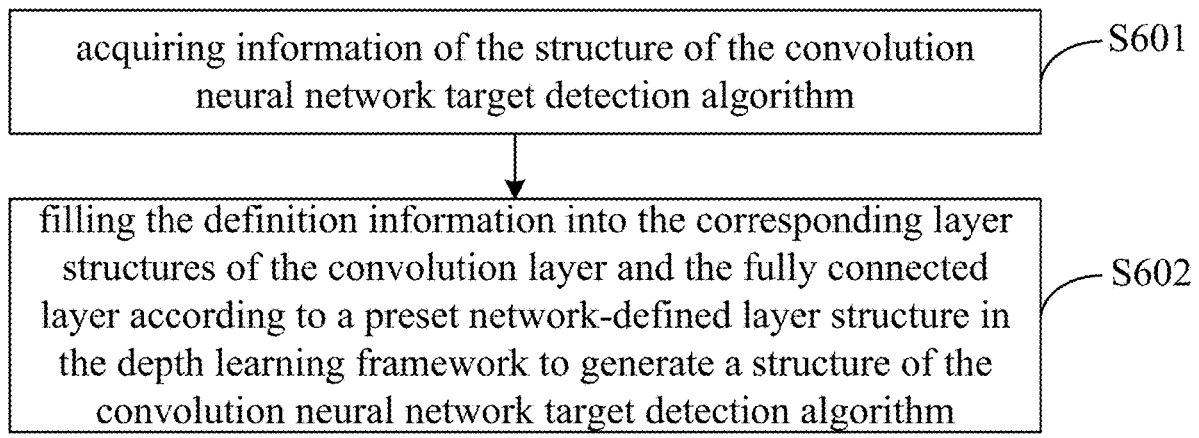
FIG. 5 is a flow chart illustrating an implementation of a structure for constructing a convolution neural network target detection algorithm in a method for locating the tracked targets according to one embodiment of the present application.

In one embodiment, as shown in FIG. 5, in step S6, the structure of a convolution neural network target detection algorithm based on a depth learning framework specifically comprises the following steps:

S601: definition information of the structure of the convolution neural network target detection algorithm is acquired.

In the embodiment, the configuration parameters required by different network structures may be different, and the structure definition of the network structures may also be different. Parameter names and specific parameter data corresponding to the parameter names of the layer structures corresponding to each network structure are preset for the construction requirements of different network structures, so that the parameter data required to be configured by the network structures to be constructed can be quickly acquired from the definition information according to the parameter names of the network structures to be constructed, and thus can be quickly filled in in the subsequent process of constructing the network structure.

For example, in the layer structure, the parameter name is a name of the layer, a type of the layer or a type definition of the output data, etc., and the specific parameter data corresponding to the parameter name, such as the specific parameter corresponding to the "name of the layer" is "conv2 (the second convolution layer)", the specific parameter corresponding to "type of layer" is "convolution" or the specific parameter corresponding to "type definition of output data" is "data", etc.

S602: the definition information is filled into the corresponding layer structures of the convolution layer and the fully connected layer according to a preset network-defined layer structure in the depth learning framework to generate a structure of the convolution neural network target detection algorithm.

In the embodiment, the preset network definition structure includes a name of a layer, a type of the layer, a layer parameter corresponding to the type of the layer, a type definition of output data, a learning rate of filtering in filtering parameters, an attenuation rate of filtering in filtering parameters, etc.

For example, if one layer structure of the preset network definition structure comprises the name of the layer, the type of the layer, the learning rate of filtering in the filtering parameters, the attenuation rate of filtering in the filtering parameters and the like, the layer structure of the model definition structure can be set as follows:
layer{
name:" "
type:" "
param{
lr_mult:" "
decay_mult:" "
}
}

When the name of a layer is "conv1", the type of layer is "convolution", the learning rate of filtering in the filtering parameters is "1", and the attenuation rate of filtering in the filtering parameters is "1", the resulting structure is described as:
layer{
name:"conv1"
type: "convolution"
param{
lr_mult:"1"
decay_mult:"1"
}
}

In the embodiment, with the definition information of the structure of the convolution neural network target detection algorithm obtained, specific parameter data corresponding to the same parameter name in the layer structure defined by the preset network in the definition information is added into the layer structure defined by the preset network, that is, the layer structure of the convolution layer and the layer structure of the fully connected layer corresponding to the definition information can be rapidly generated in a depth learning framework. The structure of the convolution neural network target detection algorithm is generated, the operation is simple, convenient and fast, errors are not easy to occur, the specific parameter data can be quickly modified through parameter names, and the structure of the convolution neural network target detection algorithm is convenient to improve.

Figure 6:
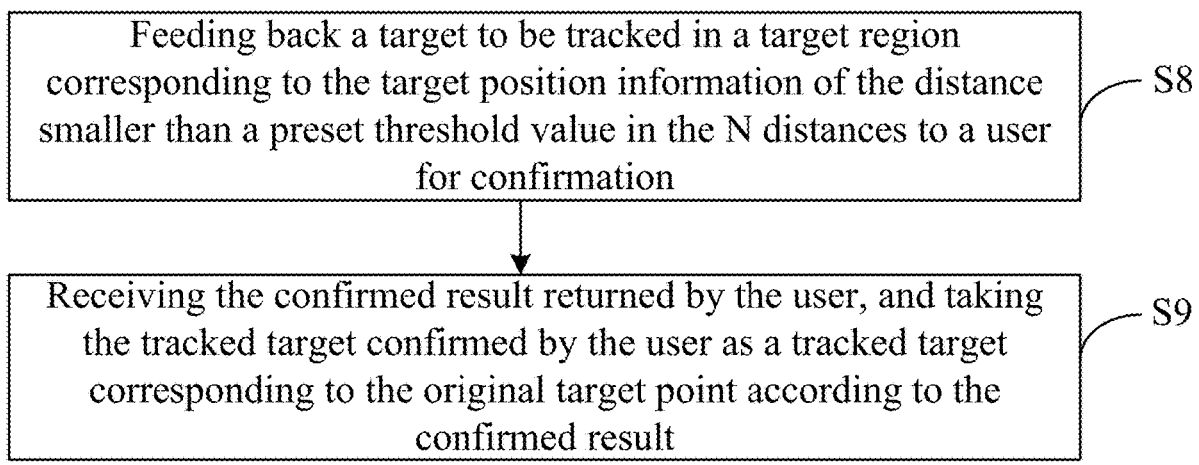
FIG. 6 is a flow chart illustrating an implementation of a method for locating the tracked targets according to one embodiment of the present invention.

In one embodiment, as shown in FIG. 6, after step S3, the method for locating the tracked targets further comprises the following steps:

S8: a target to be tracked in a target region corresponding to the target position information of the distance smaller than a preset threshold value in the N distances is fed back to a user for confirmation.

Specifically, in order to further improve the accuracy of locating the tracked target, a target to be tracked in a target region corresponding to a distance smaller than the distance threshold can be sent to a user for confirmation by setting a distance threshold so as to improve the accuracy of locating the tracked target.

S9: the confirmed result returned by the user is received, and the tracked target confirmed by the user is taken as a tracked target corresponding to the original target point according to the confirmed result.

Specifically, when the user receives the target to be tracked in the target region corresponding to the distance smaller than the preset threshold value obtained in step S8, the user can select one tracked target from the target to be tracked according to the original target point of the image of the current frame as a confirmed result and return the confirmed result so as to accurately locate the tracked target.

In the embodiment, the target to be tracked in the target region corresponding to the distance smaller than the threshold value is sent to the user for confirmation, so that the user selects one tracked target from the target to be tracked according to the original target point of the current frame image as a confirmed result and returns, the tracked target can be accurately located, and the accuracy of locating the tracked target is improved.

It should be understood that the size of the sequence numbers of the steps in the above embodiments is not meant to imply a sequence of carrying out these steps which should be determined by their function and inherent logic, and should not be construed as limiting the implementation of the embodiments of the present application in any way.

Figure 7:
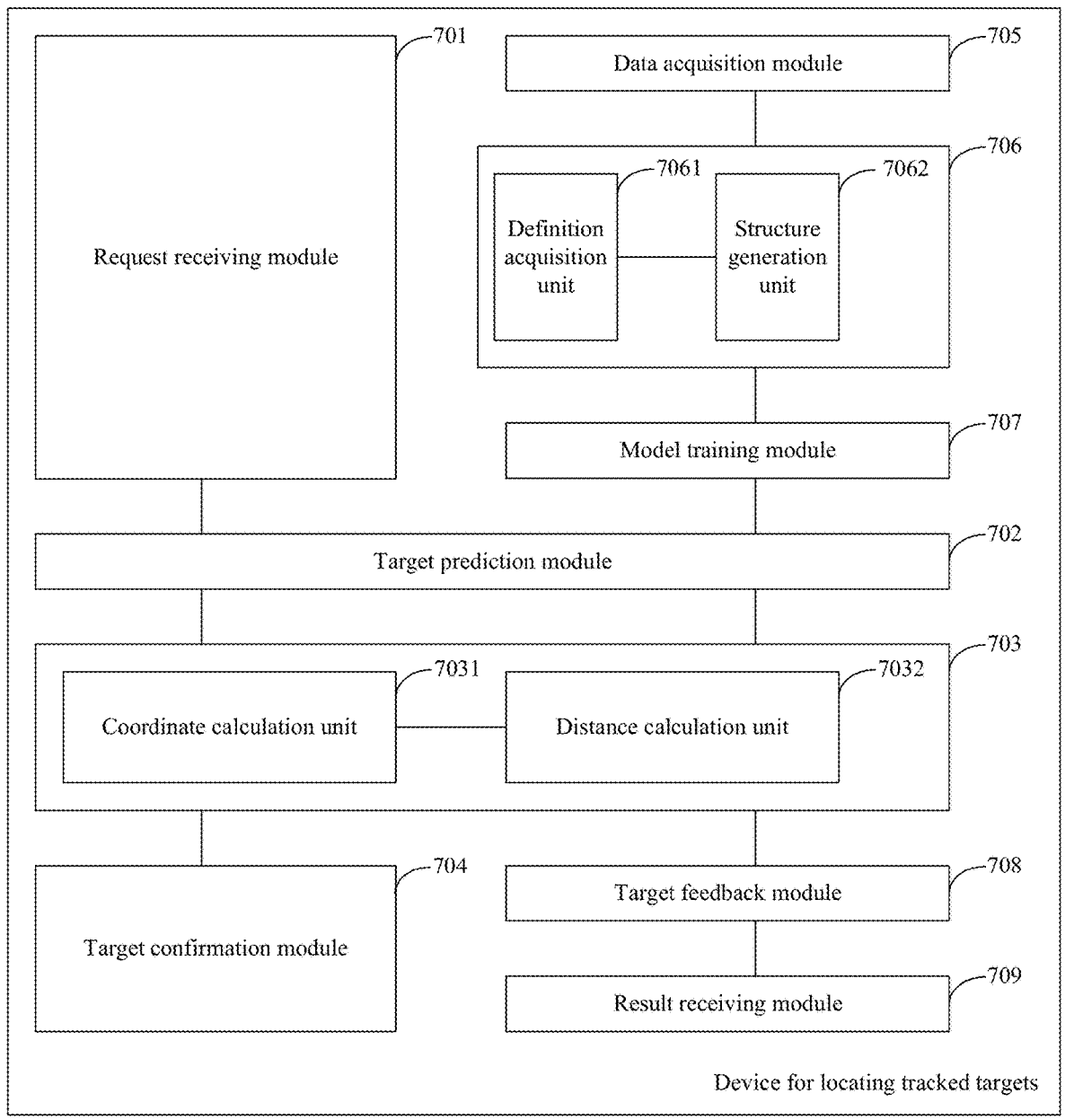
FIG. 7 is a schematic diagram of a device for locating the tracked targets in one embodiment of the present application.

In one embodiment, a device for locating tracked targets is provided, and the device for locating the tracked targets corresponds to the method for locating the tracked targets in the embodiment. As shown in FIG. 7, the device for locating the tracked targets includes a request receiving module 701, a target predicting module 702, a distance calculating module 703, and a target confirming module 704. Each functional module is described in detail as follows:

the request receiving module 701 used for acquiring original position information of an original target point selected by a user contained in a locating request if the locating request of a tracked target is received, wherein the original position information comprises a current frame image of the original target point in currently played video data and original coordinates of the original target point in the current frame image;

the target prediction module 702 used for carrying out target prediction on the current frame image according to a preset target prediction model to obtain a target prediction result, wherein the target prediction model is a convolution neural network model comprising two convolution layers and two fully connected layers, the target prediction result comprises N target regions and target position information corresponding to each of target regions, N is a positive integer, and each of the target regions comprises a target to be tracked;

the distance calculation module 703 used for calculating Euclidean distances between each of the targets to be tracked and the original target point according to the target position information and the original coordinates of each of the target regions to obtain N distances; and the target confirmation module 704 used for selecting a distance with the smallest numerical value from the N distances as a target distance, acquiring target position information corresponding to the target distance, and determining a target to be tracked in a target region corresponding to the acquired target position information as a tracked target corresponding to the original target point.

Further, the distance calculation module 703 includes:

a coordinate calculation unit 7031 used for calculating center point coordinates $(x_{i_0}, y_{i_0})$ of a target region corresponding to the $i^{th}$ target position information according to the following center point coordinates formula, aiming at each target position information:

$$(x_{i_0}, y_{i_0}) = \left(x_i + \frac{w_i}{2}, y_i + \frac{h_i}{2}\right)$$

wherein i is a positive integer, and 0<i≤N, and $x_i$ is an abscissa of upper left coordinates of the target region corresponding to the $i^{th}$ target position information, $y_i$ is an ordinate of the upper left coordinates, $w_i$ is a width of the target region corresponding to the $i^{th}$ target position information, and $h_i$ is a height of the target region corresponding to the $i^{th}$ target position information.

A distance calculation unit 7032 used for calculating an Euclidean distance $d_i$ between the $i^{th}$ center point coordinates $(x_{i_0}, y_{i_0})$ and the original coordinates $(\Delta x, \Delta y)$ for each of the center point coordinates:

$$d_i = \sqrt{(\Delta x - x_{i_0})^2 + (\Delta y - y_{i_0})^2}$$

Further, the device for locating the tracked targets further comprises:

a data acquisition module 705 used for acquiring sample training image data;

a structure construction module 706 used for constructing the structure of the convolution neural network target detection algorithm based on the depth learning framework;

a model training module 707 used for training the structure of the convolution neural network target detection algorithm by using the sample training image data to obtain the target prediction model in the structure of the convolution neural network target detection algorithm.

Further, the structure building module 706 includes:

a definition acquisition unit 7061 used for acquiring definition information of the structure of the convolution neural network target detection;

a structure generation unit 7062 used for filling the definition information into the corresponding layer structures of the convolution layer and the fully connected layer according to a preset network-defined layer structure in the depth learning framework to generate a structure of the convolution neural network target detection algorithm.

Further, the device for locating the tracked targets further comprises:

a target feedback module 708 used for feeding back a target to be tracked in a target region corresponding to the target position information of the distance smaller than a preset threshold value in the N distances to a user for confirmation; and a result receiving module 709 used for receiving the confirmed result returned by the user, and taking the tracked target confirmed by the user as a tracked target corresponding to the original target point according to the confirmed result.

For a specific definition of the device for locating the tracked targets, reference can be made to the above definition of the method for locating the tracked targets, which will not be described in detail here. The various modules in the device for locating the tracked targets described above may be implemented in whole or in part by software, hardware, and combinations thereof. The modules may be embedded in hardware or separate from the processor in the computer device, or may be stored in software in a memory in the computer device, such that the processor invokes operations corresponding to the modules.

Figure 8:
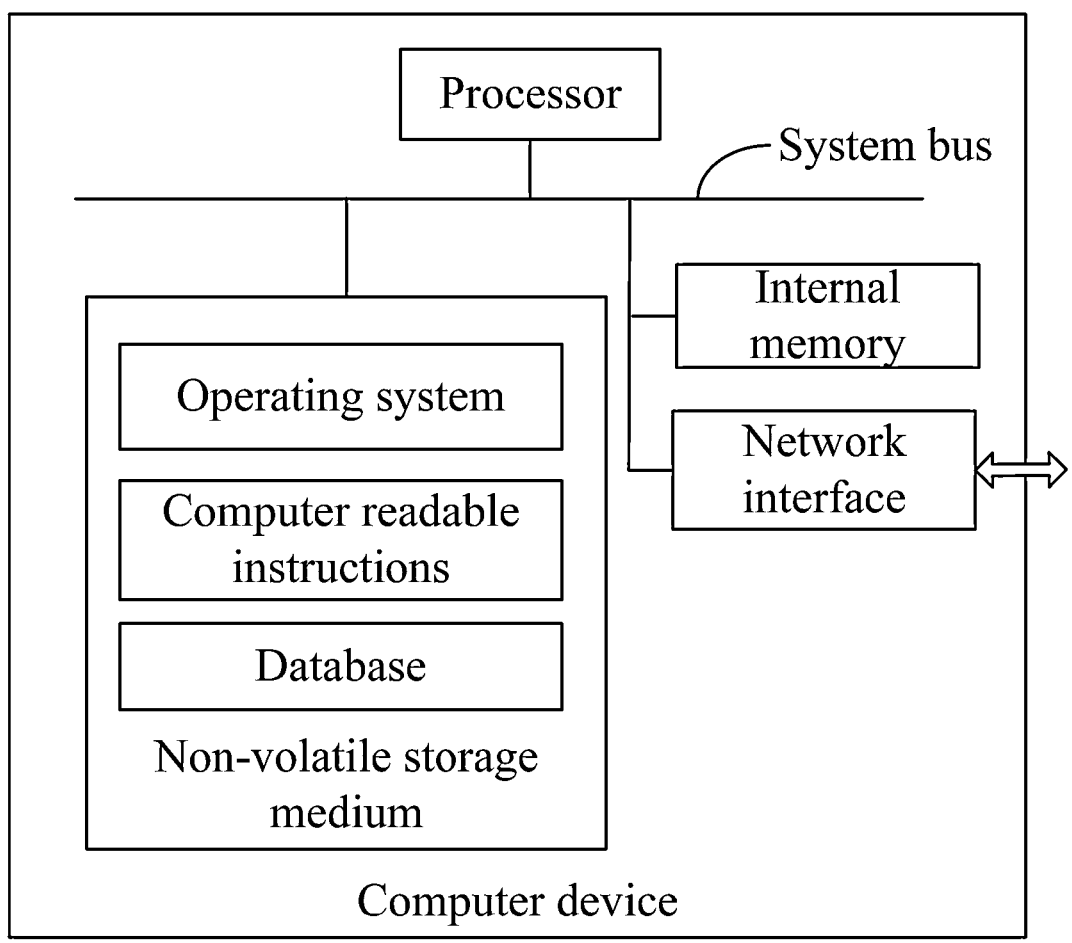
FIG. 8 is a schematic diagram of a computer device in one embodiment of the present application.

In one embodiment, a computer device is provided, which may be a server, the internal structure of which may be as shown in FIG. 8. The computer device includes a processor, a memory, a network interface, and a database connected by a system bus. Wherein the processor of the computer device is used for providing computing and control capability. The memory of the computer device includes a non-volatile storage medium and an internal memory. The non-volatile storage medium stores an operating system, computer readable instructions, and a data library. The internal memory provides an environment for the operation of an operating system and computer-readable instructions in a non-volatile storage medium. The database of the computer device is used for storing video data. The network interface of the computer device is used for communicating with an external terminal through a network connection. The computer readable instructions are executed by a processor to implement a method for tracking a target.

In one embodiment, a computer device is provided that includes a memory, a processor, and computer readable instructions stored on the memory and executable on the processor that, when executed, carry out the steps of the above method for locating a tracked target, such as steps S1-S4 shown in FIG. 2. Alternatively, the processor, when executing the computer-readable instructions, performs the functions of the various modules/units of the device for locating the tracked targets of the embodiments described above, such as the functions of modules 701 to 704 shown in FIG. 7. This will not be repeated herein to avoid repetition.

In one embodiment, there is provided a non-volatile storage medium having stored thereon computer readable instructions which, when executed by a processor, implement a method for locating tracked targets in one embodiment of the method described above, or which, when executed by a processor, implement the functions of modules/units in a device for locating the tracked targets in one embodiment of the device described above. This will not be repeated herein to avoid repetition.

It will be appreciated by a person skilled in the art that all or part of the processes for implementing the above embodiments may be implemented by computer-readable instructions stored in a non-volatile computer-readable storage medium that, when executed, may comprise the processes of the embodiments of the methods as described above. Any reference to memory, storage, databases, or other media used in the various embodiments provided herein may include, among other things, non-volatile and/or volatile memory. Non-volatile memory may include read only memory (ROM), programmable ROM (PROM), electrically programmable ROM (EPROM), electrically erasable programmable ROM (EEPROM), or flash memory. Volatile memory may include random access memory (RAM) or external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink, DRAM (SLDRAM), Rambus direct RAM (RDRAM), direct Rambus dynamic RAM (DRAM), and a memory bus dynamic RAM (RDRAM) or the like.

It will be clear to a person skilled in the art that, for convenience and conciseness of description, only the above-mentioned division of functional units and modules is exemplified, and in practical applications, the above-mentioned distribution of functions can be performed by different functional units and modules, i.e., dividing the internal structure of the device into different functional units or modules, as required, to perform all or part of the functions described above.

The above embodiments are merely illustrative of the technical solutions of the present application and are not intended to be limiting thereof; although the present application has been described in detail with reference to the foregoing embodiments, it will be understood by a person skilled in the art that modifications may be made to the technical solutions described in the foregoing embodiments or equivalents may be substituted for some of the technical features thereof; such modifications and substitutions do not depart from the spirit and scope of the embodiments of the present invention, and are intended to be included within the scope of this application.

What is claimed is:

1. A method for locating tracked targets, characterized in that the method for locating the tracked targets comprises the following steps:

acquiring original position information of an original target point selected by a user contained in a locating request if the locating request of a tracked target is received, wherein the original position information comprises a current frame image of the original target point in currently played video data and original coordinates of the original target point in the current frame image;

carrying out target prediction on the current frame image according to a preset target prediction model to obtain a target prediction result, wherein the target prediction model is a convolution neural network model comprising two convolution layers and two fully connected layers, the target prediction result comprises N target regions and target position information corresponding to each of target regions, N is a positive integer, and each of the target regions comprises a target to be tracked;

calculating Euclidean distances between each of the targets to be tracked and the original target point according to the target position information and the original coordinates of each of the target regions to obtain N distances; and selecting a distance with the smallest numerical value from the N distances as a target distance, acquiring target position information corresponding to the target distance, and determining a target to be tracked in a target region corresponding to the acquired target position information as a tracked target corresponding to the original target point;

wherein after the Euclidean distance between each of the targets to be tracked and the original target point is calculated according to the target position information and the original coordinates of each of the target regions to obtain N distances, feeding back a target to be tracked in a target region corresponding to the target position information of the distance smaller than a preset threshold value in the N distances to a user for confirmation; and receiving a confirmed result returned by the user, and taking the tracked target confirmed by the user as a tracked target corresponding to the original target point according to the confirmed result.

2. The method for locating the tracked targets according to claim 1, characterized in that the target position information corresponding to the target region comprises upper left coordinates of the target region, a width and a height of the target region, wherein the Euclidean distance between each of the targets to be tracked and the original target point is calculated according to the target position information and the original coordinates of each of the target regions to obtain N distances, which comprises:

aiming at each target position information, calculating center point coordinates $(x_{i_0}, y_{i_0})$ of a target region corresponding to the $i^{th}$ target position information according to the following center point coordinates formula:

$$(x_{i_0}, y_{i_0}) = \left(x_i + \frac{w_i}{2}, y_i + \frac{h_i}{2}\right)$$

wherein i is a positive integer, and $0 < i \leq N$, $x_i$ is an abscissa of the upper left coordinates of the target region corresponding to the $i^{th}$ target position information, $y_i$ is an ordinate of the upper left coordinates, $w_i$ is a width of the target region corresponding to the $i^{th}$ target position information and $h_i$ is a height of the target region corresponding to the $i^{th}$ target position information; and calculating the Euclidean distance $d_i$ between the $i^{th}$ center point coordinates $(x_{i_0}, y_{i_0})$ and the original coordinates $(\Delta x, \Delta y)$ for each of the center point coordinates:

$$d_i = \sqrt{(\Delta x - x_{i_0})^2 + (\Delta y - y_{i_0})^2}$$

3. The method for locating the tracked targets according to claim 1, characterized in that, before a target prediction result is obtained by carrying out target prediction on the current frame image according to a preset target prediction model, the method for locating the tracked targets further comprises the following steps:

acquiring sample training image data;

constructing a structure of a convolution neural network target detection algorithm based on a depth learning framework; and training the structure of the convolution neural network target detection algorithm by using the sample training image data to obtain the target prediction model in the structure of the convolution neural network target detection algorithm.

4. The method for locating the tracked targets according to claim 3, characterized in that the construction of the convolution neural network target detection algorithm based on the depth learning framework comprises:

acquiring definition information of the structure of the convolution neural network target detection algorithm;

filling the definition information into the corresponding layer structures of the convolution layer and the fully connected layer according to a preset network-defined layer structure in the depth learning framework to generate a structure of the convolution neural network target detection algorithm.

5. A computer device, comprising a memory, a processor and computer readable instructions stored in the memory and executable on the processor, characterized in that the processor, when executing the computer readable instructions, carries out the following steps:

acquiring original position information of an original target point selected by a user contained in a locating request if the locating request of a tracked target is received, wherein the original position information comprises a current frame image of the original target point in currently played video data and original coordinates of the original target point in the current frame image;

carrying out target prediction on the current frame image according to a preset target prediction model to obtain a target prediction result, wherein the target prediction model is a convolution neural network model comprising two convolution layers and two fully connected layers, the target prediction result comprises N target regions and target position information corresponding to each of target regions, N is a positive integer, and each of the target regions comprises a target to be tracked;

calculating Euclidean distances between each of the targets to be tracked and the original target point according to the target position information and the original coordinates of each of the target regions to obtain N distances; and selecting a distance with the smallest numerical value from the N distances as a target distance, acquiring target position information corresponding to the target distance, and determining a target to be tracked in a target region corresponding to the acquired target position information as a tracked target corresponding to the original target point;

wherein after the Euclidean distance between each of the targets to be tracked and the original target point is calculated according to the target position information and the original coordinates of each of the target regions to obtain N distances, feeding back a target to be tracked in a target region corresponding to the target position information of the distance smaller than a preset threshold value in the N distances to a user for confirmation; and receiving the confirmed result returned by the user, and taking the tracked target confirmed by the user as a tracked target corresponding to the original target point according to the confirmed result.

6. The computer device according to claim 5, characterized in that the target position information corresponding to the target region comprises upper left coordinates of the target region, a width and a height of the target region, wherein the Euclidean distance between each of the targets to be tracked and the original target point is calculated according to the target position information and the original coordinates of each of the target regions to obtain N distances, which comprises:

aiming at each target position information, calculating center point coordinates $(x_{i_0}, y_{i_0})$ of a target region corresponding to the $i^{th}$ target position information according to the following center point coordinates formula:

$$(x_{i_0}, y_{i_0}) = \left(x_i + \frac{w_i}{2}, y_i + \frac{h_i}{2}\right)$$

wherein i is a positive integer, and $0<i\leq N$, $x_i$ is an abscissa of the upper left coordinates of the target region corresponding to the $i^{th}$ target position information, $y_i$ is an ordinate of the upper left coordinates, $w_i$ is a width of the target region corresponding to the $i^{th}$ target position information and $h_i$ is a height of the target region corresponding to the $i^{th}$ target position information; and calculating the Euclidean distance $d_i$ between the $i^{th}$ center point coordinates $(x_{i_0}, y_{i_0})$ and the original coordinates $(\Delta x, \Delta Y)$ for each of the center point coordinates:

$$d_i = \sqrt{(\Delta x - x_{i_0})^2 + (\Delta y - y_{i_0})^2}$$

7. The computer device according to claim 5, characterized in that, before a target prediction result is obtained by carrying out target prediction on the current frame image according to a preset target prediction model, the method for locating the tracked targets further comprises the following steps:

acquiring sample training image data;

constructing a structure of a convolution neural network target detection algorithm based on a depth learning framework; and training the structure of the convolution neural network target detection algorithm by using the sample training image data to obtain the target prediction model in the structure of the convolution neural network target detection algorithm.

8. The computer device according to claim 7, characterized in that the structure for constructing a convolution neural network target detection algorithm based on a depth learning framework comprises:

acquiring definition information of the structure of the convolution neural network target detection algorithm;

filling the definition information into the corresponding layer structures of the convolution layer and the fully connected layer according to a preset network-defined layer structure in the depth learning framework to generate a structure of the convolution neural network target detection algorithm.

9. One or more non-volatile readable storage media having computer-readable instructions stored thereon, characterized in that, when executed by one or more processors, cause the one or more processors to carry out the following steps:
  acquiring original position information of an original target point selected by a user contained in a locating request if the locating request of a tracked target is received, wherein the original position information comprises a current frame image of the original target point in currently played video data and original coordinates of the original target point in the current frame image;
  carrying out target prediction on the current frame image according to a preset target prediction model to obtain a target prediction result, wherein the target prediction model is a convolution neural network model comprising two convolution layers and two fully connected layers, the target prediction result comprises N target regions and target position information corresponding to each of target regions, N is a positive integer, and each of the target regions comprises a target to be tracked;
  calculating Euclidean distances between each of the targets to be tracked and the original target point according to the target position information and the original coordinates of each of the target regions to obtain N distances; and
  selecting a distance with the smallest numerical value from the N distances as a target distance, acquiring target position information corresponding to the target distance, and determining a target to be tracked in a target region corresponding to the acquired target position information as a tracked target corresponding to the original target point;
  wherein after the Euclidean distance between each of the targets to be tracked and the original target point is calculated according to the target position information and the original coordinates of each of the target regions to obtain N distances, feeding back a target to be tracked in a target region corresponding to the target position information of the distance smaller than a preset threshold value in the N distances to a user for confirmation; and
  receiving the confirmed result returned by the user, and taking the tracked target confirmed by the user as a tracked target corresponding to the original target point according to the confirmed result.

10. The non-volatile readable storage medium according to claim 9, characterized in that the target position information corresponding to the target region comprises upper left coordinates of the target region, a width and a height of the target region, wherein the Euclidean distance between each of the targets to be tracked and the original target point is calculated according to the target position information and the original coordinates of each of the target regions to obtain N distances, which comprises:
  aiming at each target position information, calculating center point coordinates $(x_{i_0}, y_{i_0})$ of a target region corresponding to the $i^{th}$ target position information according to the following center point coordinates formula:

$$(x_{i_0}, y_{i_0}) = \left(x_i + \frac{w_i}{2}, y_i + \frac{h_i}{2}\right)$$

wherein i is a positive integer, 0<i≤N, and $x_i$ is an abscissa of the upper left coordinates of the target region corresponding to the $i^{th}$ target position information, $y_i$ is an ordinate of the upper left coordinates, $w_i$ is a width of the target region corresponding to the $i^{th}$ target position information and $h_i$ is a height of the target region corresponding to the $i^{th}$ target position information; and
  calculating the Euclidean distance $d_i$ between the $i^{th}$ center point coordinates $(x_{i_0}, y_{i_0})$ and the original coordinates (Δx, Δy) for each of the center point coordinates:

$$d_i = \sqrt{(\Delta x - x_{i_0})^2 + (\Delta y - y_{i_0})^2}.$$

11. The non-volatile readable storage medium according to claim 9, characterized in that, before a target prediction result is obtained by carrying out target prediction on the current frame image according to a preset target prediction model, the method for locating the tracked targets further comprises the following steps:
  acquiring sample training image data;
  constructing a structure of a convolution neural network target detection algorithm based on a depth learning framework; and
  training the structure of the convolution neural network target detection algorithm by using the sample training image data to obtain the target prediction model in the structure of the convolution neural network target detection algorithm.

12. The non-volatile readable storage medium according to claim 11, characterized in that the structure for constructing a convolution neural network target detection algorithm based on a depth learning framework comprises:
  acquiring definition information of the structure of the convolution neural network target detection algorithm;
  filling the definition information into the corresponding layer structures of the convolution layer and the fully connected layer according to a preset network-defined layer structure in the depth learning framework to generate a structure of the convolution neural network target detection algorithm.

\* \* \* \* \*